United States Patent Office 3,047,283
Patented July 31, 1962

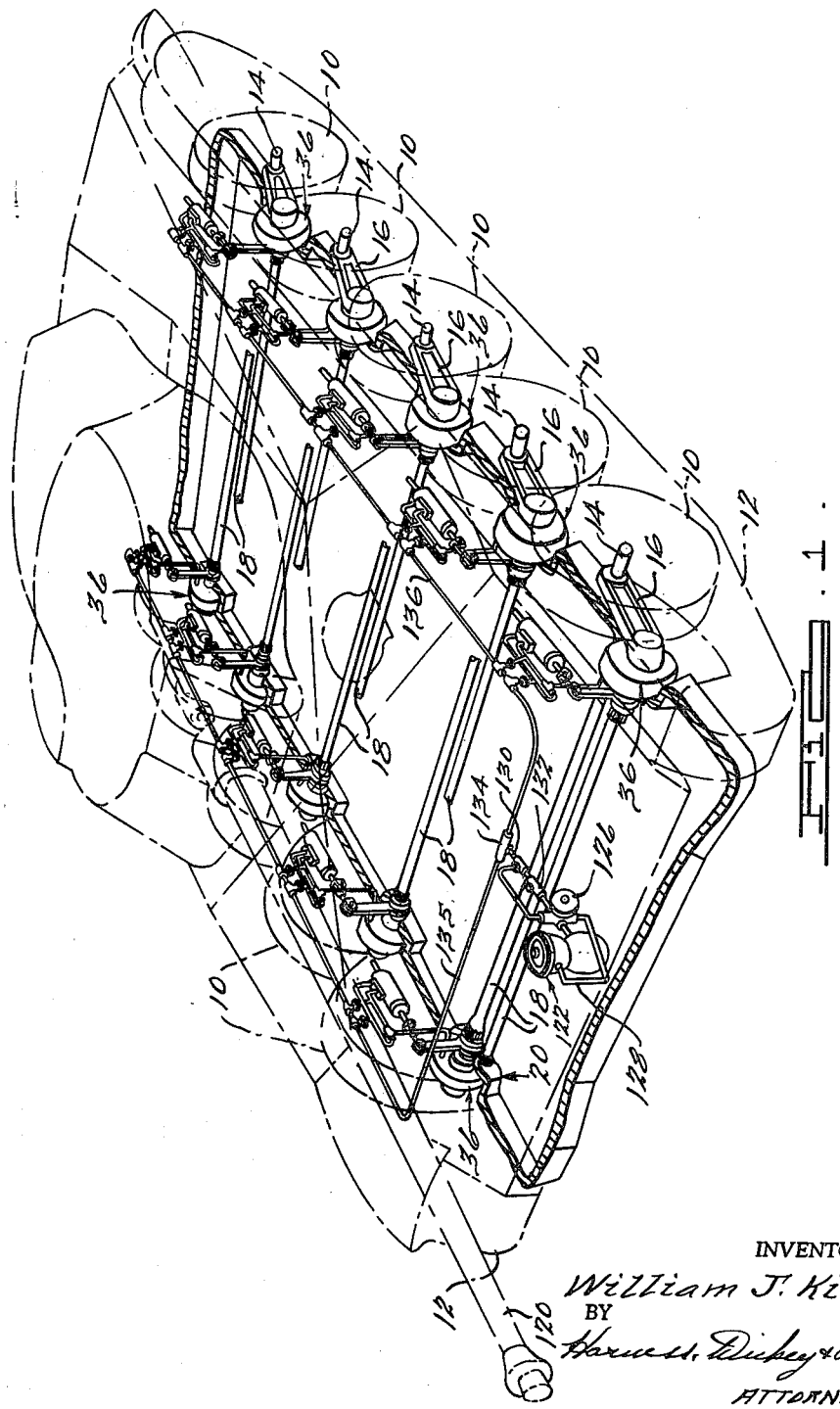

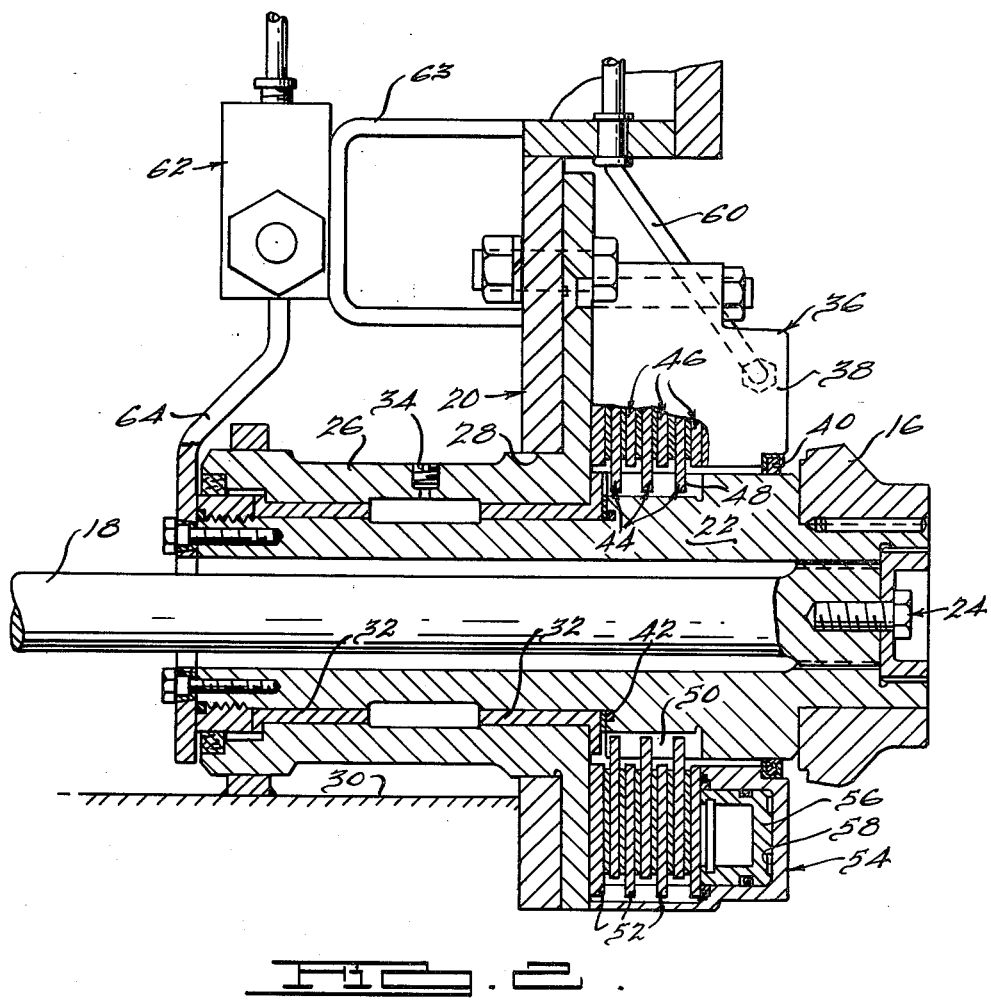

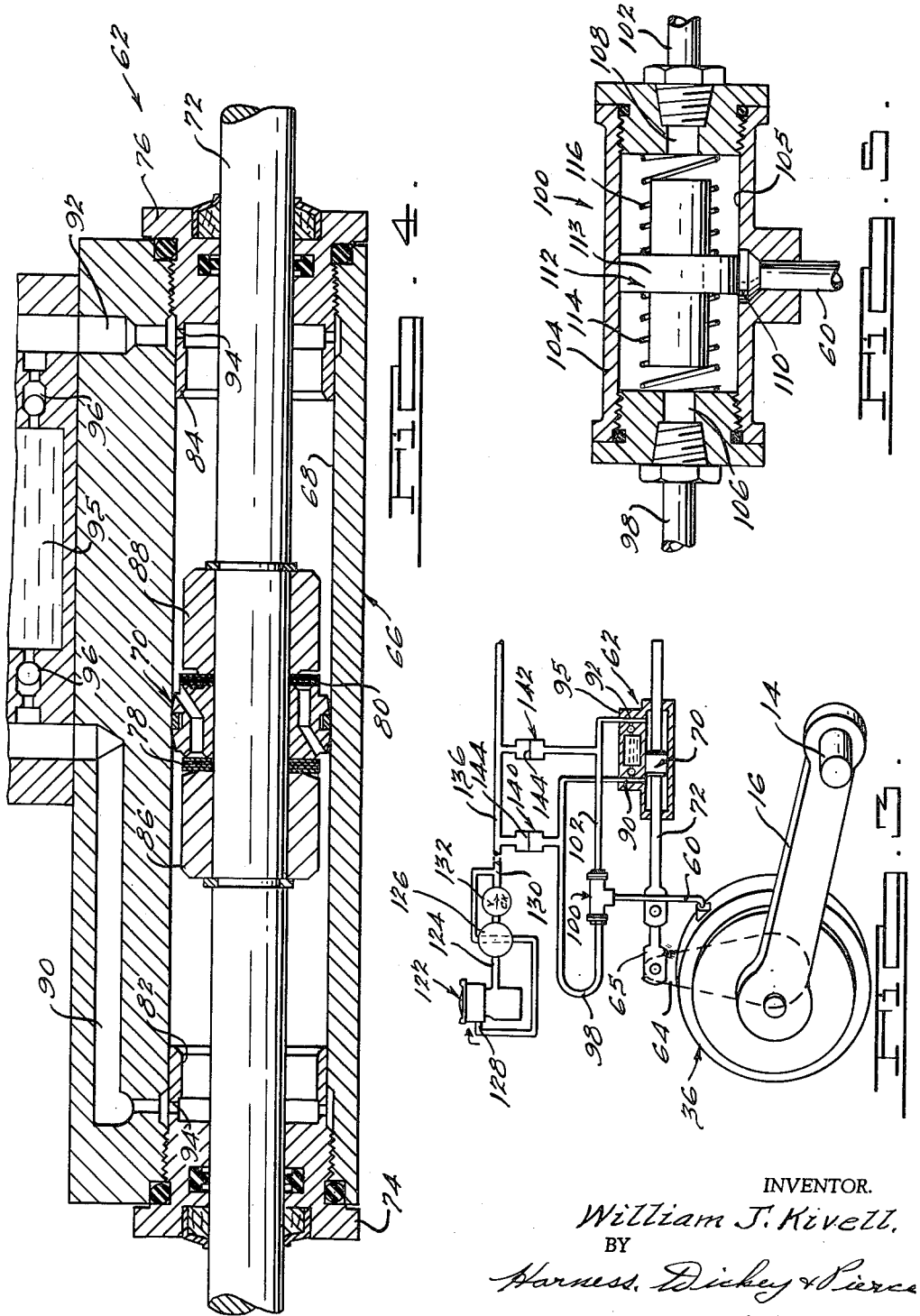

3,047,283
FLUID ACTUATED FRICTIONAL DAMPING DEVICE
William J. Kivell, Monroe, Mich., assignor to Monroe Auto Equipment Company, Monroe, Mich., a corporation of Michigan
Filed May 1, 1958, Ser. No. 732,229
9 Claims. (Cl. 267—9)

This invention relates to an improved damping device, and more particularly but not necessarily exclusively to an improved damping device for use in suspension systems in relatively heavy vehicles and including means for selectively rigidifying the suspension system when desired.

The practice of the invention is, of course, susceptible to a wide variety of uses and will find application in many fields. It is of particular advantage, however, for use in military vehicles, particularly in relatively heavy vehicles intended for travel over rough terrain.

An important feature of one embodiment of the invention is the provision of means for controllably energizing a portion of the damping device independently of relative movement between the sprung and unsprung portions of the vehicle, and thus to rigidify the suspension system and make a rigid platform of the vehicle so as, for example, to facilitate aiming and firing of a weapon carried thereon. This feature is of special advantage for us in military vehicles, which heretofore could not carry the new, recently developed high powered rifles. The recoil of these rifles so great that vehicles equipped with resilient suspension systems are often overturned or otherwise damaged when the rifles are fired. Yet a resilient suspension system is needed for normal travel of the vehicle to accommodate the ordinary stresses and strains during operation.

According to this feature of the invention, the damping device functions to damp the spring oscillations during ordinary operation of the vehicle, and may be controllably energized to "lockup" the suspension system when desired, rigidifying it and making it substantially nonresilient.

Accordingly, one important object of the present invention is to provide an improved vehicular suspension system particularly adapted for use with relatively heavy vehicles.

Another object is to provide an improved damping device for use in a suspension system including a variable retarding device for connection between two relatively movable parts, and a control device for varying the retarding effect of said retarding device responsively to relative movement of said parts.

Another object is to provide an improved vehicular suspension system including damping means comprising a fluid pressure actuatable friction device for connection between sprung and unsprung portions of a vehicle, and fluid pressure means for actuating the friction device responsively to relative movement between the sprung and unsprung portions.

Another object is to provide an improved damping device for use in a normally resilient suspension system including means for rigidifying the suspension system when desired.

Still another object is to provide an improved suspension system including a retarding device for damping a resilient element of the system, and a control device for actuating the retarding device responsively to relative movement of the resilient element.

Another object is to provide an improved suspension device of this character including also means for rapidly and positively actuating the retarding device independently of relative movement of the resilient element of the suspension system.

These and other objects are accomplished in the practice of the present invention, the herein illustrated embodiment of which comprises a fluid pressure actuatable friction damping device for connection between two relatively movable members in the spring suspension system of a vehicle such as a military tank or the like, a fluid pressure device for actuating the friction device, and means for energizing the fluid pressure device responsively to relative movement between the two movable members to which the friction device is attached.

An important feature of one embodiment of the invention is the provision for "lockup," that is, for rigidifying the suspension and effectively making it nonresilient when desired independently of the movement of the spring elements. In the herein described embodiment of the invention this is accomplished by the provision of a separately energizable fluid pressure source, and means for connecting the source in the system to actuate the friction device.

Damping devices according to the invention are especially advantageous for use in relatively heavy vehicles and in other heavy duty suspension systems where it is desired to provide smooth and effective damping under relatively heavy loads. In its application to military vehicles of the type carrying recoil type weapons, the "lockup" feature is of particular interest, since with the use of a minimum amount of added equipment the damping device may be actuated to rigidify the suspension system, thereby providing a relatively rigid platform for firing the weapon.

The invention will now be described in greater detail in connection with the accompanying drawings wherein:

FIGURE 1 is a partly schematic perspective view of a suspension system as installed on a military tank and including a damping and "lockup" arrangement according to the present invention;

FIG. 2 is a cross-sectional view of one of the suspension units of the system illustrated in FIG. 1, particularly showing details of the friction device incorporated therein;

FIG. 3 is a partly schematic view of a single suspension unit of the system illustrated in FIG. 1;

FIG. 4 is a longitudinal sectional view of a fluid pressure device, one of which is associated with each one of the suspension units of the system illustrated in FIG. 1; and FIG. 5 is a longitudinal sectional view of a control valve, one of which is incorporated in each one of the suspension units of the system shown in FIG. 1.

The damping arrangement of the present invention is illustratively shown as incorporated in a military tank of the type supported upon a plurality of resilient suspension units, each one of which includes a bogie wheel 10, which rides upon a tank track 12, and which is mounted upon a stub axle 14 fixed at the end of a torque arm 16. As shown, the tank is equipped with ten such suspension units, but in practice the number of units may be varied as desired, and is not in any way a limiting factor in the practice of the invention.

The torque arm 16 of each suspension unit is connected to a torsion bar 18, which extends transversely across substantially the full width of the tank and is rigidly secured to the tank wall 20 at its end opposite from the torque arm 16. As shown in FIG. 2, the torque arm 16 is press fitted upon and keyed to a bushing 22, which is splined to the end of the torsion bar 18 and secured thereon by a screw and washer assembly 24. The bushing 22 is rotatably mounted within a flanged tubular support 26, which is fitted within an aperture 28 in the tank wall 20 and rigidly secured to the tank wall and to the tank floor 30. A pair of sleeve bushings 32, which may be lubricated through a fitting 34 in the support 26, are provided to reduce the friction between the support 26 and the bushing 22.

A fluid pressure actuatable friction device 36 is mounted exteriorly of the tank wall 20 and connected between the wall 20 and the bushing 22 for controllably damping the oscillation of the torque arm 16. This friction device 36 may be generally similar in construction to a disc-type brake assembly, and, as shown, comprises a bell-shaped housing 38, which is securely bolted or otherwise rigidly attached to the support 26 and surrounds the bushing 22. Annular seals 40 and 42 are provided at the opposite ends of the housing 38, between the housing and the bushing 22 to protect the device 36 from dirt, grease, or the like, The housing 38 encloses a plurality of annular friction plates 44 and 46, alternate ones 44 of which have inwardly projecting tabs 48 which project into circumferentially spaced longitudinal grooves 50 formed in the bushing 22. The other ones 46 of the friction plates are secured by similar tabs 52 along their outer edges to the housing 38. The friction plates 44 and 46 are assembled in stacked array, the intermediate ones 44 being keyed to and rotatable with the bushing 22, and the other ones 46 being fixed to the housing 38. Normally, the intermediate friction plates 44 are free to turn with the bushing 22, but when the assembly is squeezed together, the intermediate plates 44 are frictionally engaged by the fixed plates 46, and a retarding, or braking force is thereby applied to damp the rotation of the bushing 22.

In operation, the plates 44 and 46 are squeezed together by fluid pressure applied within a plurality of cylinder and piston assemblies 54 contained within the housing 38 and equiangularly spaced therearound. The pistons 56 of the assemblies 54 are driven axially inwardly, that is, to the left as viewed in FIG. 2, by the application of fluid pressure within the cylinder cavities 58, only very slight movement of the pistons 56 normally being required to exert a relatively strong breaking force. A conduit system (not shown) is formed within or mounted upon the housing 38 for conducting fluid under pressure from the inlet conduit 60 relatively uniformly to all of the cylinder and piston assemblies 54.

Referring now to FIG. 3, during normal operation of the vehicle, fluid pressure for actuating the friction device 36 is supplied by a fluid pressure device 62, which is mounted upon a bracket 63 fixed to the tank wall, and which is energized by the suspension unit through a connecting link 65 and an arm 64 fixed to the inner end of the bushing 22. The fluid presure device 62 operates on principles generally similar to those of a direct acting type hydraulic shock absorber, and is shown in detail in FIG. 4. It includes a body 66 having a bore 68, within which a piston 70 is slidably fitted. The ends of the bore 68 are closed by caps 74 and 76, through which the piston rod 72 is slidably sealed. The pistons 70 is fixed to the piston rod 72, and is provided with conventional pressure relief valves 78 and 80, which control the fluid pressure build-up on the pressure side of the piston during operation. The valves 78 and 80 may, if desired, be of the velocity responsive type, or any other desired type depending upon the damping characteristics desired.

Each one of the end caps 74 and 76 is provided with an inwardly extending cup-like extension 82 and 84, respectively, which extend into the bore 68 for receiving auxiliary end portions 86 and 88 of the piston. As the piston approaches the limits of its travel within the bore 68, one or the other of the end portions 86 and 88, depending upon the direction of travel, enters into the corresponding cup-like member 82 or 84, trapping fluid within the cup-like member 82 or 84. Fluid so trapped cannot escape toward the pressure relief valve 78 or 80, and therefore a relatively high fluid pressure is built up and applied to the friction device 36 when the piston 70 approaches the limits of its travel in the bore 68. This arrangement provides positive limit stops for the vertical travel of the bogie wheels 10.

Fluid conduits 90 and 92 are formed in the body 66 leading outwardly from the oposite ends of the bore 68, and communicating with the bore through apertures 94 provided in the walls of the cup-like portions 82 and 84. A fluid reservoir 95 is mounted upon the body 66 and connected between the conduits 90 and 92 through a pair of check valves 96, which are symmetrically arranged to permit ready escape of fluid from the reservoir into the system and to restrict the flow of fluid into the reservoir. The check valves 96 are preferably provided with minute orifices of a capillary size to permit a slow, gradual flow of fluid from the system into the reservoir 95, such as may be occasioned by thermal expansion, but to limit the flow of fluid into the reservoir responsively to pressures generated by normal operation of the system.

The fluid pressure device 62 is connected to the friction device through a control valve 100, and the construction and operation of which is best shown in FIG. 5. The control valve 100 is a spool-type valve comprising a body 104 having a closed bore 105 provided with three longitudinally spaced ports 106, 108 and 110. The conduits 90 and 92 leading from the opposite ends of the pressure device 62 are respectively connected to the end ports 106 and 108 of the control valve by tubing members 98 and 102. The conduit 60 leading to the friction device 36 is connected to the intermediate control valve port 110.

The valve spool 112 is slidable within the bore 105, and includes a central land 113 which is shorter than the intermediate port 110, so that when the spool is centered in the bore 105 the port 110 is not closed, but is open at both its ends for communication with both of the end ports 106 and 108. The spool 112 is preferably made relatively long to limit its travel in the bore 105 and thereby to minimize the response time, that is, the time required for the land 113 to move from one end to the other end of the intermediate port 110. Sufficient travel is, of course, provided for so that the spool 112 can be moved in either direction sufficiently far to close off either end of the intermediate port 110, and thereby to shut off the flow of fluid between the intermediate port 110 and the end port 106 or 108 toward which the spool is moved.

In the embodiment shown, a pair of relatively light centering springs 114 and 116 are mounted on the spool 112 and held in compression between the land 113 and the end plugs 106 and 108, respectively, for centering the spool 112 when the fluid pressures acting on it are balanced. The spool 112 is normally centered by the relatively light centering springs 114 and 116, and is readily movable away from its normal, centered position by differential in fluid pressure between its opposite ends. When it is moved in either direction, the land 113 closes off communication between the intermediate port 110 and the tubing 98 or 102 at the end toward which it is moved.

Briefly, in operation, assuming the tank to be operating over rough terrain, one of the bogie wheels 10 will strike a surface obstruction tending to drive the bogie wheel upwardly relative to the tank, thus moving the torque arm 16 in a counterclockwise direction as viewed in FIG. 3. The torque arm 16 carries the arm 64 also in a counter-clockwise direction, and thus pulls to the left upon the piston rod 72, pulling the piston 70 to the left and increasing the fluid pressure in the conduits 90 and 98. The increased fluid pressure in the conduit 98 is transmitted to the lefthand end of the control valve 100 and moves the valve spool 112 to the right, thus preventing flow of hydraulic fluid from the pressure conduit 98 to the suction conduit 102 and confining the fluid pressure to the conduit 60 for actuating the friction device 36 to retard further upward movement of the bogie wheel 10.

If now the surface obstruction is such that the bogie wheel 10 is raised sufficiently far to pull the piston 70 close to the limit of its travel to the left, as viewed in FIGS. 3 and 4, the piston end portion 86 enters the cup-like portion 82 of the end cap, and since the fluid within the cup-like portion 82 cannot escape through the pressure relief valve 80, a relatively high pressure build-up results which fully actuates and "locks up" the friction device 36, thereby preventing any further upward travel of the bogie wheel 10.

Conversely, if the bogie wheel 10 under consideration encounters a pothole or recess in the surface over which the tank is travelling, it tends to fall downwardly, moving the torque arm 16 clockwise, as viewed in FIG. 3, and driving the piston 70 to the right, thereby pressurizing the conduits 92 and 102, and driving the control valve spool 112 to the left, as viewed in FIG. 5, and again applying fluid pressure through the inlet conduit 60 to the friction device 36. When the limit of downward travel is reached, the right-hand piston end portion 88 enters the cup-like portion 84 of the right-hand end cap and thereby provides a "lockup" pressure for the friction device 36 and thus limits the downward travel of the bogie wheel.

The arrangement is well suited for use in relatively heavy vehicles, and is of particular advantage for use in such vehicles designed to be driven over relatively rough terrtain and to be subjected to substantial road shocks. A relatively smooth ride is provided by the arrangement, with excellent snubbing and shock absorbing action, since the initial impact of a bump or road shock is absorbed by the springs 18 and only afterwards is the snubbing action applied. Also, a relatively solid and smooth "bottoming" action is provided at the limits of vertical travel of the bogie wheels 10, since the fluid pressure does not directly support the vehicle's weight, but rather is used indirectly, through the friction device 36, thereby arresting the travel of the bogie wheel 10 smoothly and gently.

An additional feature of the invention has to do with the arrangement for controllably "locking up" the friction device 36, either manually by the operator of the vehicle, or automatically by an external control device. As hereinabove explained, this feature is especially advantageous for use in military gun carrying vehicles wherein recoil may damage the vehicle if the gun is fired while the vehicle is supported on a resilient suspension system. In the arrangement shown, "lockup" of the suspension system is provided by actuating the friction devices 36 independently of the pressure devices 62. For this purpose an auxiliary fluid pressure device 122, which may be an electrically powered hydraulic pump, as illustrated, is connected in the system for actuating the friction damping devices 36 independently of the operation of the fluid pressure devices 62.

The high pressure outlet 124 of the auxiliary fluid pressure device 122 is connected through a two-way valve 126 to a system distribution conduit 130. The two-way valve 126 is arranged to connect either the high pressure outlet 124 or the low pressure, "tank" inlet 128 of the auxiliary pressure device to the conduit 130. As shown in FIG. 3, the two-way valve 126 is in its Off position, and the conduit 130 is not pressurized.

For normal operation, the two-way valve 126 is set as shown in FIG. 3 with the "tank" inlet 128 of the auxiliary pressure device connected to the distribution conduit 130, and the system operates in the hereinabove described manner, each one of the friction devices 36 being actuated by its individually associated fluid pressure device 62.

When it is desired to "lockup" the suspension system, all of the friction devices 36 are actuated independently of their individual pressure devices 62 by fluid pressure from the auxiliary pressure device 122. The two-way valve 126 is turned to its operate position, that is, 90° from the position shown in FIG. 3, thereby connecting the pressure outlet 124 of the auxiliary fluid pressure device to the pressure distribution line 130. The pressure distribution line 130 extends from the two-way valve 126 to a T-connection 134 and thence into two branches 135 and 136, which extend along opposite sides of the vehicle for connection to all of the individual friction devices 36. As a safety precaution, a check valve 132 is provided in the line 130 to prevent loss of pressure in the event of accidental failure of the auxiliary pressure device 122.

The branch lines 135 and 136 are connected to the fluid actuating systems of all of the suspension units. As illustratively shown in FIG. 3, each one of the tubings 98 and 102 is connected to the branch line 135 or 136 nearest to the suspension unit through a separate diaphragm type fluid pressure transmitting device 140 and 142, respectively. The devices 140 and 142 may be of any desired type, several of which are presently commercially available. They include fluid-tight diaphragms 144 which flex responsively to fluid pressure, thereby accommodating sufficient movement of fluid to pressurize the friction device 36, while still preventing any interchange of fluid between the branch line 135 or 136 and the tubings 98 and 102.

In operation, when the branch line 136 is pressurized, fluid pressure is transmitted through the pressure transmitting devices 140 and 142 to the tubings 98 and 102, and then through the tubings and the control valve 100 to the friction device 36. The operating pressure of the auxiliary pressure device 122 is preferably selected or adjusted to a value sufficient to apply close to the maximum permissible operating pressure to the friction devices 36, thereby effectively to "lockup" the suspension system, rigidifying it and forming a rigid platform of the vehicle. When the two-way valve 126 is turned to its Off position, the "lockup" pressure is released, and the suspension system is returned to its normal, resilient mode of operation.

The control valve 100 is an important feature in the "lockup" arrangement of the present invention, since it permits the use of a relatively simple fluid circuit, portions of which are used in common for normal spring damping and for locking up. The control valve 100 permits the use of a friction device having but a single fluid pressure actuating circuit, and permits pressurization of this circuit on both strokes of the fluid pressure device 62, isolating the friction device 36 from the suction end of the pressure device 62 on each stroke.

What is claimed is:

1. A damping device for use in a resilient suspension system comprising a fluid pressure actuatable friction device for connection between a sprung portion and an unsprung portion of a suspension system, a bidirectional fluid pressure device connected between said sprung and unsprung portions and having first and second fluid outlets, said fluid pressure device being arranged to develop fluid pressure at said first outlet responsively to relative movement between said portions in one direction and to develop fluid pressure at said second outlet responsively to relative movement between said portions in the opposite direction, both of said outlets being connected to said friction device for actuation thereof responsively to relative movement between said portions both in said one direction and in said opposite direction.

2. A damping device for use in a resilient suspension system comprising a fluid pressure actuatable friction device for connection between a sprung portion and an unsprung portion of a suspension system, a bidirectional fluid pressure device for connection between said sprung and unsprung portions and having first and second fluid outlets, said fluid pressure device being arranged to develop fluid pressure at said first outlet responsively to relative movement between said portions in one direction and to develop fluid pressure at said second outlet responsively to relative movement between said portions in the opposite direction, both of said outlets being connected to said friction device for actuation thereof responsively to relative movement between said portions both in said one direction and in said opposite direction, and an auxiliary fluid pressure device connected to said friction device for actuating said friction device independently of said relative movement.

3. A damping device for use in a resilient suspension system comprising a fluid pressure actuatable retarding device for connection between a sprung portion and an unsprung portion in a suspension system, said device having a port for the admission and emission of actuating fluid, a bidirectional fluid pressure device connected between said portions for energization responsively to relative movement between said portions and having first and second outlets, said fluid pressure device being arranged to develop fluid pressure at said first outlet responsively to said relative movement in one direction and to develop fluid pressure at said second outlet responsively to said relative movement in another direction, fluid conduit means for connecting said retarding device port to said fluid pressure device outlets, said conduit means including valve means for restricting the flow of fluid between said first and second outlets and for effecting communication between said inlet port and the one of said first and second outlets at which the fluid pressure is greater.

4. A damping device for use in a resilient suspension system comprising a fluid pressure actuatable retarding device for connection between a sprung portion and an unsprung portion in a suspension system, said device having a port for the admission and emission of actuating fluid, a bidirectional fluid pressure device connected between said portions for energization responsively to relative movement between said portions and having first and second outlets, said fluid pressure device being arranged to develop fluid pressure at said first outlet responsively to said relative movement in one direction and to develop fluid pressure at said second outlet responsively to said relative movement in another direction, fluid conduit means for connecting said retarding device port to said fluid pressure device outlets, said conduit means including valve means for restricting the flow of fluid between said first and second outlets and for effecting communication between said inlet port and the one of said first and second outlets at which the fluid pressure is greater, said valve means being arranged for actuation responsively to changes in the direction of the fluid pressure differential between said first and second outlets.

5. A damping device for use in a resilient suspension system comprising a fluid pressure actuatable retarding device for connection between a sprung portion and an unsprung portion in a suspension system, said device having a port for the admission and emission of actuating fluid, a bidirectional fluid pressure device connected between said portions for energization responsively to relative movement between said portions and having first and second outlets, said fluid pressure device being arranged to develop fluid pressure at said first outlet responsively to said relative movement in one direction and to develop fluid pressure at said second outlet responsively to said relative movement in another direction, fluid conduit means for connecting said retarding device port to said fluid pressure device outlets, said conduit means including valve means for restricting the flow of fluid between said first and second outlets and for effecting communication between said inlet port and the one of said first and second outlets at which the fluid pressure is greater, said valve means being arranged for actuation responsively to changes in the direction of the fluid pressure differential between said first and second outlets, and an auxiliary fluid pressure device connected to said conduit means for developing fluid pressure at both of said outlets simultaneously independently of relative movement between said sprung and unsprung portions, said valve means being arranged to open communication between said port and both of said outlets when the fluid pressures at said outlets are approximately equal to each other, whereby fluid pressure developed by said auxiliary pressure device is transmitted to said retarding device for actuating it independently of the operation of said bidirectional pressure device.

6. In a vehicular suspension system of the type including a torsion bar spring having one end journaled in a sprung portion of the vehicle and rotatable with respect thereto responsively to load variations, a damping device comprising a fluid pressure actuatable friction brake arranged for frictionally connecting the rotatable end of the spring to a rigid part of the sprung portion of the vehicle for damping the spring oscillations, and a fluid pressure device connetced to said friction brake for actuating it responsively to rotation of the spring end away from a predetermined angular position relative to the sprung portion, said fluid pressure device including a cylinder and piston assembly arranged for developing fluid pressure at one end of said cylinder responsively to rotation of said spring in one direction and for generating fluid pressure at the opposite end of said cylinder responsively to rotation of said spring end in the opposite direction, and conduit means for connecting both ends of said cylinder to said brake for actuating it responsively to rotation of the spring end both in the one and in the opposite directions, said conduit means including valve means arranged to close communication between said brake and the relatively low pressure end of said cylinder responsively to the pressure differential between the ends of said cylinder.

7. In a vehicular suspension system of the type including a torsion bar spring having one end journaled in a sprung portion of the vehicle and rotatable with respect thereto responsively to load variations, a damping device comprising a fluid pressure actuatable friction brake arranged for frictionally connecting the rotatable end of the spring to a rigid part of the sprung portion of the vehicle for damping the spring oscillations, and a fluid pressure device connected to said friction brake for actuating it responsively to rotation of the spring end away from a predetermined angular position relative to the sprung portion, said fluid pressure device including a cylinder and piston assembly arranged for developing fluid pressure at one end of said cylinder responsively to rotation of said spring in one direction and for generating fluid pressure at the opposite end of said cylinder responsively to rotation of said spring end in the opposite direction, and conduit means for connecting both ends of said cylinder to said brake for actuating it responsively to rotation of the spring end both in the one and in the opposite directions, said conduit means including valve means arranged to close communication between said brake and the relatively low pressure end of said cylinder responsively to the pressure differential between the ends of said cylinder, and a separately energizable auxiliary pressure device connected to said conduit means and operative to actuate said brake independently of the operation of said fluid pressure device.

8. In a vehicular suspension system of the type including a torsion bar spring having one end journaled in a sprung portion of the vehicle and rotatable with respect thereto responsively to load variations, a damping device comprising a fluid pressure actuatable friction brake arranged for frictionally connecting the rotatable end of the spring to a rigid part of the sprung portion of the vehicle for damping the spring oscillations, and a fluid pressure device connected to said friction brake for actuating it responsively to rotation of the spring end away from a predetermined angular position relative to the sprung portion, said fluid pressure device including a cylinder and piston assembly arranged for developing fluid pressure at one end of said cylinder responsively to rotation of said spring in one direction and for generating fluid pressure at the opposite end of said cylinder responsively to rotation of said spring end in the opposite direction, and conduit means for connecting both ends of said cylinder to said brake for actuating it responsively to rotation of the spring end both in the one and in the opposite directions, said conduit means including a valve arranged to close communication between said brake and the relatively low pressure end of said cylinder responsively to the pressure differential between the ends of said cylinder, said valve including a body defining a bore, a spool movable within said bore, means defining first and second ports longitudinally spaced apart and communicating with said bore, and means defining a third port communicating with said bore at a place between said first and second ports, said spool being longitudinally movable responsively to fluid pressure differences between opposite ends of said bore and having a land effective upon movement of said spool to shut off communication between said third port and the one of said first and second ports toward which said spool is moved, said land being shorter than said third port so that when said land is centered with respect thereto said third port is in open communication with both said first and said second ports.

9. In a vehicular suspension system of the type including a torsion bar spring having one end journaled in a sprung portion of the vehicle and rotatable with respect thereto responsively to load variations, a damping device comprising a fluid pressure actuatable friction brake arranged for frictionally connecting the rotatable end of the spring to a rigid part of the sprung portion of the vehicle for damping the spring oscillations, a fluid pressure device connected to said friction brake for actuating it responsively to rotation of the spring end away from a predetermined angular position relative to the sprung portion, said fluid pressure device including a cylinder and piston assembly arranged for developing fluid pressure at one end of said cylinder responsively to rotation of the spring end in one direction and for generating fluid pressure at the opposite end of said cylinder responsively to rotation of the spring end in the opposite direction, conduit means for connecting both ends of said cylinder to said brake for actuating it responsively to rotation of the spring end both in the one and in the opposite directions, said conduit means including a valve arranged to close communication between said brake and the relatively low pressure end of said cylinder responsively to the pressure differential between the ends of said cylinder, and a separately energizable auxiliary pressure device connected to said conduit means and operative to actuate said brake independently of the operation of said fluid pressure device, said valve including a body defining a bore, a spool movable within said bore, means defining first and second ports longitudinally spaced apart and communicating with said bore, and means defining a third port communicating with said bore at a place between said first and second ports, said spool being longitudinally movable responsively to fluid pressure differences between opposite ends of said bore and having a land effective upon movement of said spool to shut off communication between said third port and the one of said first and second ports toward which said spool is moved, said land being shorter than said third port so that when said land is centered with respect thereto said third port is in open communication with both said first and said second ports.

References Cited in the file of this patent

UNITED STATES PATENTS

| | | |
|---|---|---|
| 1,819,855 | Wilson | Aug. 18, 1931 |
| 1,921,951 | Simon | Aug. 8, 1933 |
| 2,017,086 | Zouck | Oct. 15, 1935 |
| 2,017,115 | Zouck | Oct. 15, 1935 |
| 2,169,850 | Rabe | Aug. 15, 1939 |
| 2,714,517 | Powell | Aug. 2, 1955 |
| 2,792,235 | Federspiel | May 14, 1957 |
| 2,927,540 | Seley | Mar. 8, 1960 |